(No Model.)
J. I. HOKE.
WHEEL.
No. 308,160. Patented Nov. 18, 1884.
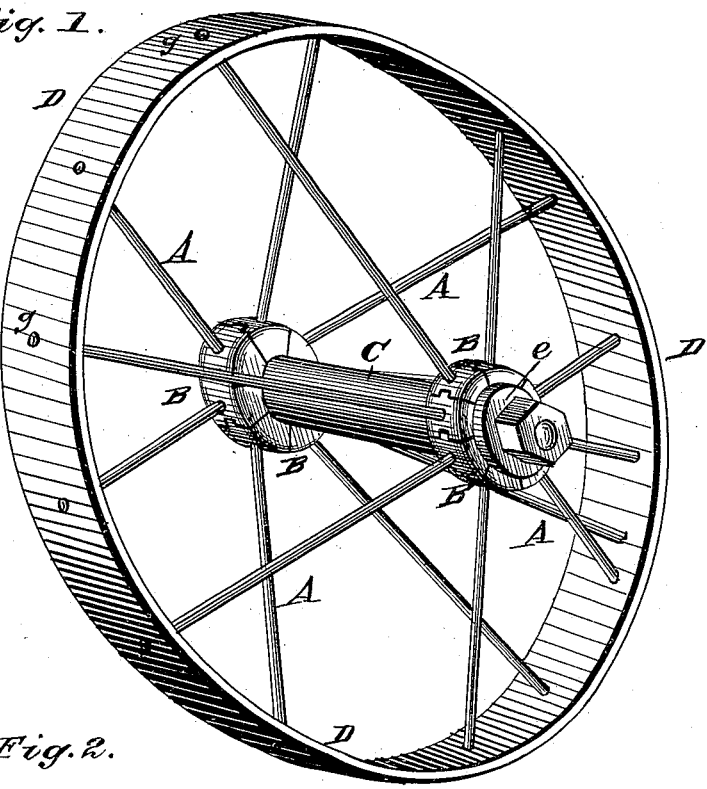
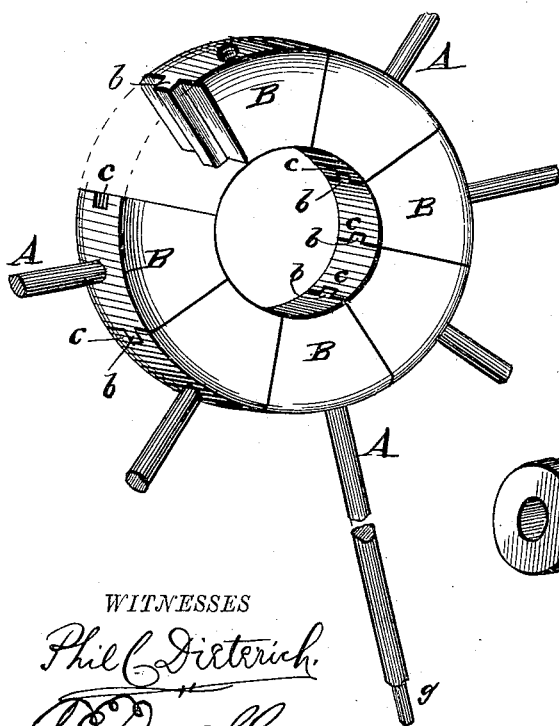
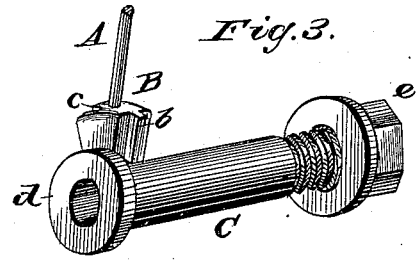
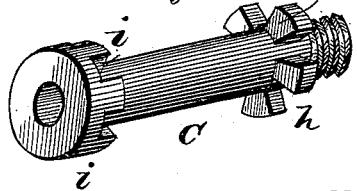
WITNESSES
Phil C. Dieterich
C. C. Dowell
INVENTOR
John I. Hoke
by
J. M. Alexander
Attorney

UNITED STATES PATENT OFFICE.

JOHN I. HOKE, OF SOUTH BEND, INDIANA.

WHEEL.

SPECIFICATION forming part of Letters Patent No. 308,160, dated November 18, 1884.

Application filed April 7, 1884. (No model.)

*To all whom it may concern:*

Be it known that I, JOHN I. HOKE, of South Bend, in the county of St. Joseph and State of Indiana, have invented certain new and useful Improvements in Wheels; and I do hereby declare that the following is a full, clear, and exact description thereof, reference being had to the accompanying drawings, and to the letters of reference marked thereon, which form part of this specification.

This invention relates to certain improvements in wheels, and it is designed specially for wheels of sulky-plows, although it may be applied with advantage to wheels of other descriptions.

The objects of the invention are to produce a wheel which will be cheap, easily constructed, and light and durable, while it will possess great strength. These objects I attain by the means illustrated in the accompanying drawings, in which—

Figure 1 represents a perspective view of my improved wheel entire; Fig. 2, a perspective view of a detached portion of the same, showing the method of construction in detail. Fig. 3 represents a detached view of a hollow sleeve forming part of my improved wheel, and Fig. 4 represents a similar view of a modification of the sleeve.

The letter A indicates the spokes of the wheel, which at their inner ends are provided with a series of segmental sections, B, and each of which is provided with a tenon, $b$, at one end, and with a corresponding groove, $c$, at the other. The said sections are of such size and number that when the tenons and grooves are interlocked, as indicated plainly in Fig. 2 of the drawings, the sections will form a complete circle.

The letter C indicates a hollow sleeve, having a flange, $d$, at one end, the other end being shouldered and screw-threaded for the reception of a flanged nut, $e$. The outer ends of the spokes A are formed with tenons $g$, which set through apertures in the tire D, as shown in Fig. 1, being riveted down on the outside. In constructing the wheel two sets of these spoke-sections are employed, one being set up against the flange on the sleeve, as shown in Fig. 1, and the other upon the opposite end of the sleeve, the spokes inclining inwardly toward the tire, and setting alternately into the apertures before mentioned. When thus placed, the flanged nut is screwed against the outer sections, binding the spokes firmly in the tire and wedging the sections tightly together. The ends of the spokes are then riveted down upon the tire, completing the wheel.

In the modification shown in Fig. 4 the flange on the sleeve is formed with recesses $h$, and the other end is provided with a recessed boss, $i$, in this case the spoke-sections set in the respective recesses being held therein by means of the flanged nut. It will be seen that by this construction the hub is self-centering, that no adjustments are necessary, and that the spokes sustain their load both by suspension and thrust.

Having thus described my invention, what I claim, and desire to secure by Letters Patent, is—

1. In a double dished wheel, the combination, with a sleeve having a flange on one end and a clamping-nut on the other, of radial segments tenoned and grooved, fitted together at both ends of said sleeve, as described, and having the spokes secured into them, substantially in the manner specified.

2. The combination, with the tenoned spokes and tire, of the segmental sections tenoned and grooved as described, the flanged sleeve upon which said sections are secured, and the flanged nut whereby the parts are wedged and bound together, substantially as specified.

3. The combination, with the sleeve having a recessed flange at one end and a recessed boss and screw-thread at the other, of the spoke-sections adapted to set in said recesses, and the flanged nuts by which they are secured in place, substantially as specified.

In testimony that I claim the foregoing as my own I affix my signature in presence of two witnesses.

JOHN I. HOKE.

Witnesses:
JAMES DU SHANE,
WILLIS A. BUGBEE.